Feb. 2, 1960 V. KOBLER ET AL Re. 24,772

ADJUSTABLE SPEED DRIVING MECHANISM FOR DRY SHAVERS

Original Filed July 18, 1952

INVENTORS
Victor Kobler
Werner Kobler
BY Sommers & Young
ATTORNEYS.

United States Patent Office

Re. 24,772
Reissued Feb. 2, 1960

24,772

ADJUSTABLE SPEED DRIVING MECHANISM FOR DRY SHAVERS

Victor Kobler and Werner Kobler, Zurich, Switzerland

Original No. 2,771,672, dated November 27, 1956, Serial No. 299,581, July 18, 1952. Application for reissue March 24, 1958, Serial No. 723,620

Claims priority, application Switzerland July 21, 1951

3 Claims. (Cl. 310—47)

Matter enclosed in heavy brackets [ ] appears in the original patent but forms no part of this reissue specification; matter printed in italics indicates the additions made by reissue.

This invention relates to *adjustable speed driving mechanism for* dry shavers of the type having at least one shear head and an electrical driving unit.

Dry shavers operate according to the shearing principle, as is well known, and for this purpose they are provided with cutter members which are movable relatively to each other. These cutter members conventionally are so formed that a plurality of hairs may be simultaneously cut, for which purpose the cutter members are provided with a number of cutter gaps.

Conventional dry shavers usually have rotatable or reciprocating cutter elements. In both cases the hairs can enter the cutter gaps and be cut off only when the gaps are open. The more rapidly the relative movement of the cutter members is effected, the shorter is the opening time of the cutter gaps, thus reducing the possibility for a hair to enter a cutter gap. With rotating cutter members the closing and the opening of the cutter gaps is carried out at constant speed, while with reciprocating cutter members certain motionless periods occur, which facilitate the intrusion of the hairs into the cutter gaps. However, also in case of a reciprocating cutter member, the danger exists at conventional operating speeds, that the hairs are only partially cut or that only the hair tops are cut off. Hairs of the beard projecting beyond the level of the skin may be sheared off rapidly and perfectly by means of fast movable cutter members. Even when at each closure of the cutter gaps always only small hair particles are cut off, a fast shaving is, nevertheless, brought about by the relatively, high operating speed of the movable cutter members. However, as soon as the hair stubbles are cut down to the level of the skin, certain difficulties arise for a clean shaving when fast movable cutter members are used. In order to be able to cut such hair stubbles down to below the skin level, that is, below the level of the salient pore points, the skin must be stretched by suitable formation of the cutter members and their respective cutter gaps, in order to lift the hair stubbles out of their pores. The resistance of these lifted hair-bristles, however, in most cases is not sufficient to permit them to enter the cutter gaps during the short opening periods of the latter; they are rather crowded back into their pores by the rapidly moving cutter member. In order to enable a clean shaving, that is, a severing of the hair stubbles below the level of the salient pore points, the lifted hair stubbles ought to be able to enter freely and as deep as possible into the cutter gaps without encountering resistance, so that they may be cut as close as possible to their respective roots. But this may be attained only when the opening period of the cutter gaps is comparatively long, i.e. when the operating speed of the cutter member is low.

Since the shaving of longer hairs, that is, the preshaving with slowly moving cutter members is not suitable, whilst for the close shaving a low operating speed is of advantage, the dry shaver according to the present invention, is provided with at least one shear head, with an electric driving unit, and with easily accessible means for changing the operating speed of the movable shear head parts.

*According to the invention a driving motor of special design having at least three poles and a correspondingly shaped interrupter operator is provided in order to permit especially slow speeds of operation of the shear heads compared to the speeds attainable with ordinary interrupter type motors having armatures provided with only two poles.*

The present invention will now be described more fully with reference to the accompanying drawings illustrating by way of example an embodiment of the invention, and in which.

Figure 1:
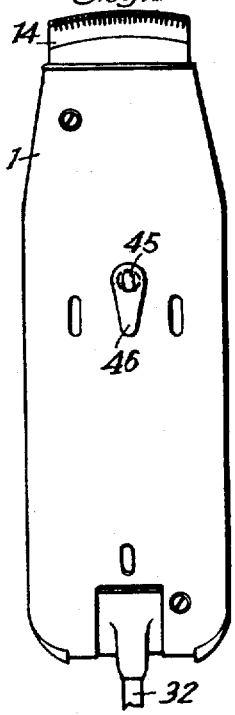
Figs. 1 and 2 are the inner and outer views, respectively, of a dry shaver case.
Figure 2:
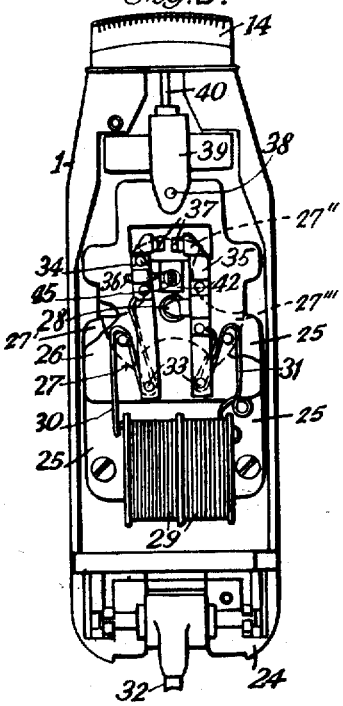

The dry shaver illustrated in Figs. 1 and 2 has a two-piece casing 1 formed as a handle, which casing carries on its upper end a shear head 14. In the interior of the handle 1 an electric motor of the interrupter type and of known construction is disposed. This small motor has a magnet core provided with pole shoes 25, which are arranged between two shields 26, *one of which is partially broken away in Fig. 2 to show an end portion of one of the poles shoes 25. At the other side of Fig. 2 shield 26 is broken away to show a portion of pole 27'.* [A three-pole] An armature 27, *having three poles arranged at about 120° apart angularly,* is journalled between the upper shield parts and mounted upon a shaft 28, the forward end of which is shaped as a triangular portion *and which, due to the positions of its lobes 28', 28'' and 29', serves, in operation, to reciprocate interrupter contact lever 35 in timed coordination with the turning of three-poled armature 27.* The two juxtaposed magnet coils 29 are disposed upon the said magnet core. The inner ends of these coils are connected with springs 30 and 31, while the outer ends of the coils are connected in a not shown manner with a flexible cable 32. In the forward shield 26 two interrupter contact levers 34, 35 are journalled by means of the pivots 33. The lever 34 is provided with an adjusting screw 36 by means of which the distance between the two contacts 37 may be controlled. The two springs 30, 31, *the end of which are hooked around levers 34 and 35 respectively,* tend to keep the contacts 34, 35 in engagement with each other. A pin 38, on which a swing bracket 39 is mounted, passes through the shield 26, the bracket 39 being rocked by the rotating *triangular* shaft 28 *which constitutes a triangular cam, the positions of the lobes of which, coordinate* [in known manner] *the interruption of the current to coordinate with the three-pole construction armature 27.* The bracket 39 carries a driver 40, which is in operating connection with the (not shown) cutter knife of the shear head 14 and serves in known manner to reciprocate the knife.

In addition to the mentioned construction, a block 42, having a circular opening 43, is arranged between the two interrupter levers 34, 35, on the forward shield 26. A lateral recess 44 provided in the block 42 is connected with this opening 43. The latter serves as bearing journal for a flattened pin 45 constituting a cam. This cam 45 is secured against axial displacement in a case part of the dry shaver and may be rotated by means of a lever 46 arranged on the outside of the case 1.

Figure 3:
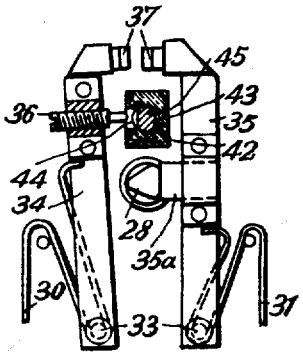
Fig. 3 shows a detail of Fig. 2, [at enlarged scale] *on an enlarged scale and before the initial adjustment of the parts*.
Figure 4:
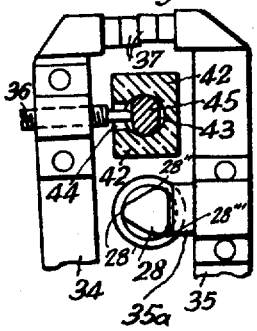
Fig. 4 shows [at], on an enlarged scale a detail of Fig. 2 [in the] with the parts adjusted to one speed position of the electrical contacts.

As more clearly indicated in Figs. 3 and 4, the cam 45 serves as an abutment for the adjusting screw 36 of the interrupter lever 34. Once the screw 36 is adjusted, then the upright position of the cam 45 (Fig. 4) corresponds to a certain inner end position of the interrupter lever 34; a second inner end position of the lever 34 is provided by the transversely positioned cam 45. Assuming the dry shaver is put in operation by any known means, the cam 45 being in the upright position indicated in Fig. 3, the interrupter contact lever 34 is then swung towards the inside *by spring 31* until the adjusting screw 36 abuts against the cam 45. The contacts 37 at the same time make contact with each other and the different parts take the position shown in Fig. 4. The current circuit consequently is closed. The electromagnetic flux produced between the polar arcs aligns the two armature poles situated closest to each other with the pole shoes. The armature thus is rotated and the interrupted lever 35 is swung towards the outside by means of the triangular position of the shaft 28, so that the said current circuit is interrupted. The armature can rotate according to the imparted momentum, whereupon the described process repeats itself. Each armature revolution thus effects a thrice opening and closing of the contacts. It is evident that the longer the contact period of the contacts is, the faster the armature will rotate. In the position of the cam 45 according to Fig. 4, the lever 34 presses the lever 35 somewhat towards the right hand side, so that separation of the contacts 37 is brought about only, when one of the cam points of the triangular shaft end 28 engages the abutment 35a of the lever 35. The position of the cam 45 as shown in Fig. 4 thus corresponds to the normal, that is, relatively high operating speed of the shear head cutter and this position is adjusted for the pre-shaving operation. When, however, the cam 45 is transversely positioned by means of the lever 46, that is, turned through 90° from the position shown in Fig. 4, then the interrupter lever 34, upon the operation of the shaver (the turning of the cam 45, of course, could also be effected while the motor is running), can be swung less far to the right hand side, as this was the case with the upright positioned cam 45. Thereby the lever 35 is swung further towards the left hand side, i.e., it bears with its abutment 35a against a flat side of the triangular portion of the shaft 28 even when the contacts 37 are closed. As may be easily realized, the interrupter lever 35 is swung out of its location earlier when the shaft 28 rotates, than this was the case in the position according to Fig. 4, whereby the contact periods of the contacts 37 also become shorter. Consequently, the armature rotates more slowly than this was the case at the first mentioned adjustment of the cam 45 and thus also the shear head cutter moves at a slower speed. Thereby the up-lifted hair stubbles are enabled to enter freely into the cutter gaps of the shear-head, so that a clean and close shaving is accomplished.

While we have specifically shown and described a preferred embodiment which our invention may assume in practice, it will be understood that this embodiment is merely for the purposes of illustration and description and that various other forms may be devised within the scope of our invention as defined in the following claims.

We claim:

[1. In a power operated dry shaver, a shearhead having a movable cutter element, an electric motor for driving said element, means for drivingly connecting said motor with said movable element, a casing in which said motor and shearhead are mounted, said motor having a pair of relatively reciprocable contact carriers, an electrical contact on each of said carriers, screw means for adjusting said contacts relative to each other for setting the speed of operation of said motor, said screw adjustment means being mounted on one of said contact carriers, an abutment mounted in fixed relation to said casing and adjustable relative to said screw means for effecting further adjustment of said contacts for controlling the speed of operation of said motor within a certain range of speed, means for adjusting said abutment, said screw means being engageable upon said abutment.]

[2. A power operated dry shaver according to claim 1, and in which said abutment means comprises a cam, said means for adjusting said abutment comprising manually operatable means extending outside said casing for ready adjustment.]

*3. In a power operated dry shaver, a movable element operated by an electric motor, means for drivingly connecting said motor with said movable element are casing in which said motor and movable element are mounted, said motor having a pair of relatively reciprocable contact carriers, an electrical contact on each of said carriers, screw means for adjusting said contacts relative to each other for setting the speed of operation of said motor, said screw adjustment means being mounted on one of said contact carriers, an abutment cam mounted in fixed relation to said casing and adjustable relative to said screw means for effecting further adjustment of said contacts for controlling the speed of operation of said motor within a certain range of speed, means for adjusting said abutment, said screw means being engageable upon said abutment cam, said means for adjusting said abutment cam comprising manually operable means extending outside said casing for ready adjustment.*

References Cited in the file of this patent or the original patent

UNITED STATES PATENTS

| | | |
|---|---|---|
| 1,828,895 | Hanley | Oct. 27, 1931 |
| 1,922,824 | Schick | Aug. 15, 1933 |
| 2,164,425 | Rand | July 4, 1939 |
| 2,231,466 | Hanley | Feb. 11, 1941 |
| 2,238,383 | Collins | Apr. 15, 1941 |
| 2,286,629 | Kobler et al. | June 16, 1942 |
| 2,446,296 | Movitz | Aug. 3, 1948 |
| 2,509,868 | Irrgang | May 30, 1950 |